United States Patent
Benway

(10) Patent No.: US 7,322,176 B2
(45) Date of Patent: Jan. 29, 2008

(54) FLEXIBLE SOUND BARRIER CURTAIN FOR GRASS COLLECTION CONTAINER

(75) Inventor: Randy Edward Benway, Horicon, WI (US)

(73) Assignee: Deere & Company, Moline, IL (US)

( * ) Notice: Subject to any disclaimer, the term of this patent is extended or adjusted under 35 U.S.C. 154(b) by 96 days.

(21) Appl. No.: 11/104,001

(22) Filed: Apr. 12, 2005

(65) Prior Publication Data

US 2006/0225395 A1     Oct. 12, 2006

(51) Int. Cl.
*A01D 43/06* (2006.01)
(52) U.S. Cl. .................................. 56/202; 56/320.2
(58) Field of Classification Search .............. 56/202, 56/5, 16.6, 194, 199, 320.1, 320.2
See application file for complete search history.

(56) References Cited

U.S. PATENT DOCUMENTS

| | | | | |
|---|---|---|---|---|
| 3,199,277 A | 8/1965 | Moody | ............... | 56/25.4 |
| 3,722,192 A | 3/1973 | Corbett | ............... | 56/202 |
| 3,874,152 A * | 4/1975 | Dahl | ............... | 56/202 |
| 3,958,401 A | 5/1976 | Carpenter | ............... | 56/202 |
| 3,971,198 A | 7/1976 | Lane | ............... | 56/202 |
| 4,054,023 A | 10/1977 | Carpenter | ............... | 56/202 |
| 4,056,161 A * | 11/1977 | Allen, Jr. | ............... | 181/290 |
| 4,104,852 A | 8/1978 | Tackett | ............... | 56/202 |
| 4,126,986 A | 11/1978 | Kidd | ............... | 56/202 |
| 4,173,111 A | 11/1979 | Peterson | ............... | 56/202 |
| 4,193,249 A | 3/1980 | Tackett | ............... | 56/11.9 |
| 4,265,079 A | 5/1981 | Hoffmann | ............... | 56/202 |
| 4,377,063 A | 3/1983 | Leaphart | ............... | 56/202 |
| 4,393,645 A | 7/1983 | Moore | ............... | 56/202 |
| 4,399,647 A | 8/1983 | Soldavini | ............... | 56/202 |
| 4,426,830 A | 1/1984 | Tackett | ............... | 56/202 |
| 4,433,532 A | 2/1984 | McCunn | ............... | 56/320.2 |
| 4,522,019 A | 6/1985 | Edwards et al. | ............... | 56/202 |
| 4,532,755 A | 8/1985 | Schemelin et al. | ............... | 56/16.6 |
| 4,532,756 A * | 8/1985 | Merkel | ............... | 56/202 |
| 4,631,909 A | 12/1986 | McLane | ............... | 56/202 |
| 4,648,238 A | 3/1987 | Greider et al. | ............... | 56/202 |
| 4,738,088 A | 4/1988 | Klever et al. | ............... | 56/202 |
| 4,848,070 A | 7/1989 | Berglund | ............... | 56/202 |
| 4,969,320 A | 11/1990 | Langford | ............... | 56/16.6 |
| 5,074,106 A | 12/1991 | Di Paolo | ............... | 56/202 |
| 5,195,310 A | 3/1993 | Kettler et al. | ............... | 56/202 |
| 5,224,327 A | 7/1993 | Minoura et al. | ............... | 56/13.3 |
| 5,564,241 A * | 10/1996 | Ogorchock et al. | ............... | 52/309.12 |
| 5,564,265 A | 10/1996 | Pitt | ............... | 56/202 |
| 5,718,017 A * | 2/1998 | Pavlick | ............... | 15/340.1 |
| 5,870,889 A * | 2/1999 | Togoshi et al. | ............... | 56/320.2 |

(Continued)

FOREIGN PATENT DOCUMENTS

EP     0 610 062 A1     8/1994

(Continued)

*Primary Examiner*—Thomas B. Will
*Assistant Examiner*—Alicia Torres

(57) ABSTRACT

A grass collection container for a grass mowing machine includes a bag or hopper attached to a support frame under the plastic top cover with air permeable panels, and a flexible sound barrier curtain attached to the support frame over the air permeable panels. The flexible sound barrier curtain has a thickness of between about 1 mm and about 5 mm. An air passage is provided between the bag or hopper and the flexible sound barrier curtain.

16 Claims, 2 Drawing Sheets

U.S. PATENT DOCUMENTS

| | | |
|---|---|---|
| 6,151,875 A | 11/2000 | Collins ........................ 56/202 |
| 6,226,970 B1 | 5/2001 | Busboom et al. ............. 56/202 |
| 6,474,054 B2 | 11/2002 | Schaedler et al. ........... 56/16.7 |
| 6,546,710 B1 | 4/2003 | DeHart ........................ 56/202 |
| 6,735,930 B2 | 5/2004 | Sugiyama et al. ............ 56/202 |
| 6,860,094 B1 | 3/2005 | Abrams ........................ 56/202 |

FOREIGN PATENT DOCUMENTS

| | | |
|---|---|---|
| FR | 2 399 200 | 3/1979 |
| GB | 2 280 585 A | 2/1995 |

* cited by examiner

FLEXIBLE SOUND BARRIER CURTAIN FOR GRASS COLLECTION CONTAINER

FIELD OF THE INVENTION

This invention relates generally to grass collection containers for grass mowing machines, and more specifically to noise reduction for grass mowing machines with grass collection containers.

BACKGROUND OF THE INVENTION

Grass mowing machines may have grass collection containers connected to the discharge duct of a mower deck. The discharge duct may extend from the mower deck, upwardly and rearwardly to a collection container mounted at or on the rear end of the vehicle. A variety of different grass collection containers are available.

For example, grass collection containers for grass mowing machines may be flexible fabric-type bags or hoppers. These grass collection containers may be relatively simple, light weight and economical. The fabric may be a mesh or other air permeable material to allow air flow through the bag while trapping grass clippings. The bags or hoppers may be carried or supported by a frame attached to the rear of the vehicle, and may be covered by a solid top cover. U.S. Pat. Nos. 3,722,192; 3,874,152; 3,971,198; 4,054,023; 4,173,111; 4,377,063; 4,393,645; 4,522,019; 5,195,310; 5,564,265; 6,226,970; and 6,546,710 relate generally to flexible fabric grass collection containers.

Alternatively, grass collection containers may be solid or rigid cans or containers. The solid containers may be plastic, metal or similar material. Solid grass collection containers also require an air outlet and tend to be more complex, heavy and costly than mesh bags or hoppers. U.S. Pat. Nos. 3,199,277; 4,265,079; 4,399,647; 4,426,830; 4,631,909; 4,648,238; and 5,074,106 relate generally to solid or rigid grass collection containers. Some grass collection containers also may have a liner inside an outer bag or container. U.S. Pat. Nos. 3,958,401; 3,971,198; and 4,054,023 relate generally to grass collection containers with disposable inner bags.

Some grass mowing machines include an auxiliary fan or blower to help propel clippings from the mower deck through a discharge duct into a grass collection container. U.S. Pat. Nos. 4,104,852; 4,193,249; 4,426,830; and 5,224,327 relate generally to auxiliary fans or blowers for grass collection.

Air flow into and through grass collection containers contributes to the noise of grass mowing machines. In recent years, regulations limit the noise generated by these machines. Attempts to reduce or limit the noise have included decreasing the speed of rotary cutting blades and reducing the wing or lift of the blades. However, decreasing blade speed or lift tends to impair cutting performance and limits the effectiveness of grass collection. There continues to be a need to reduce or limit the noise from grass mowing machines without sacrificing cut quality or collection. A low cost, effective solution is needed to reduce noise from these machines.

Grass clippings may be collected under a variety of conditions, including adverse conditions such as wet or thick grass. To handle adverse conditions, grass mowing machines may be designed with increased mower blade speeds, and improvements may be made to the air handling properties of the grass collection containers. There is a need to reduce the noise of grass mowing machines that perform well in adverse conditions, without decreasing mower blade speeds or air handling properties of grass collection containers.

SUMMARY OF THE INVENTION

A grass collection container is provided with a flexible sound barrier curtain that reduces or limits the noise from grass mowing machines without sacrificing cut quality or collection. The flexible sound barrier curtain is a low cost, effective solution to reduce noise. The flexible sound barrier curtain surrounds the vertically aligned air permeable panels but is sufficiently separated from the panels to allow air flow through the panels and downwardly.

DESCRIPTION OF THE PREFERRED EMBODIMENT

Figure 1:
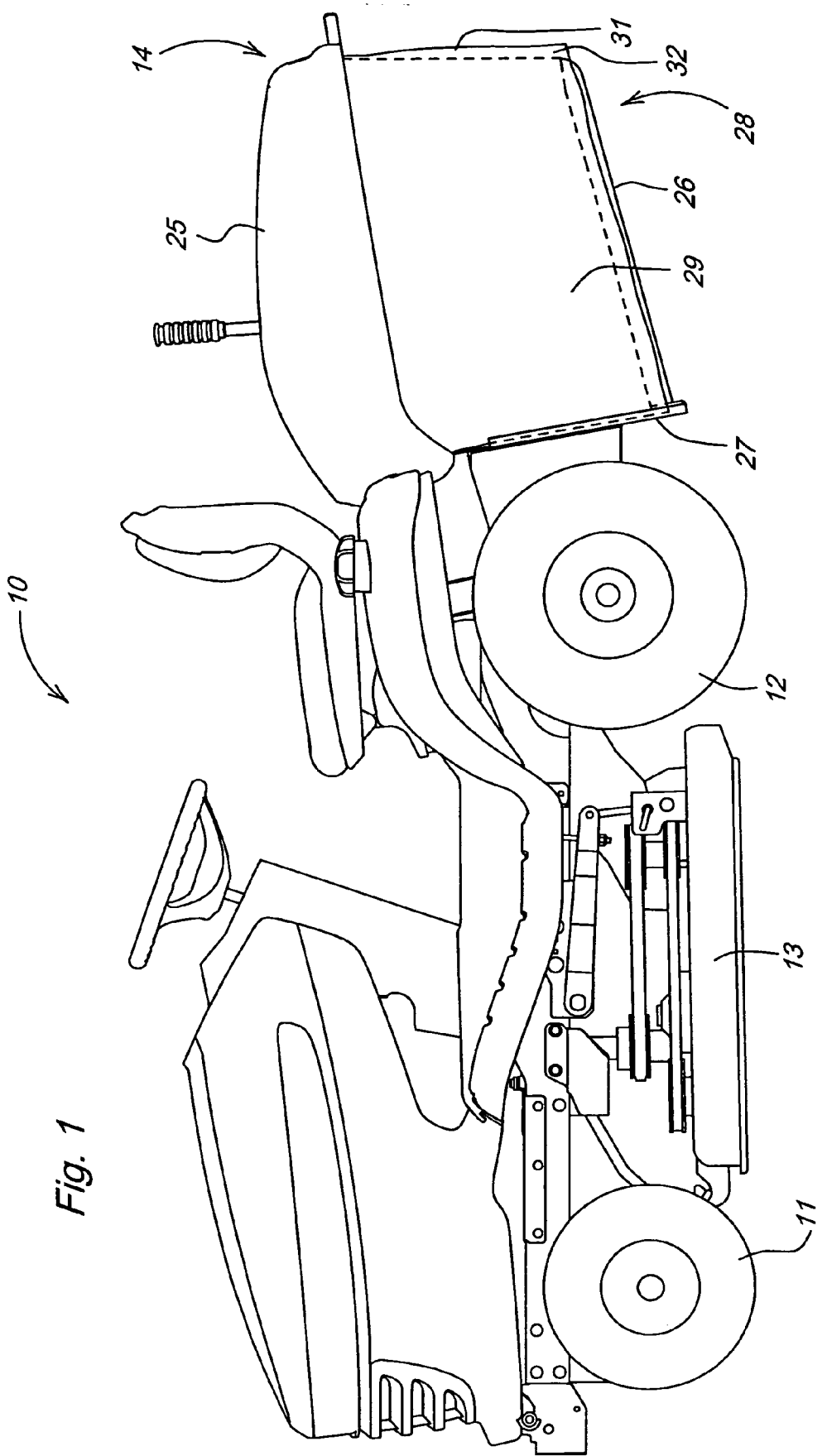
FIG. 1 is a side view of a lawn and garden tractor having a grass collection container with a flexible sound barrier according to a first embodiment of the invention.

In one embodiment shown in FIG. 1, lawn and garden tractor 10 has front wheels 11, rear wheels 12, mower deck 13 suspended from the vehicle frame between the front and rear wheels, and grass collection container 14 mounted to the vehicle. Mower deck 13 may cover one or more rotary cutting blades that may cut and propel grass clippings through a discharge duct extending rearwardly from the mower deck to the grass collection container. Optionally, a blower or fan may be mounted in a housing at the discharge duct to help propel grass clippings into the grass collection container.

Figure 2:
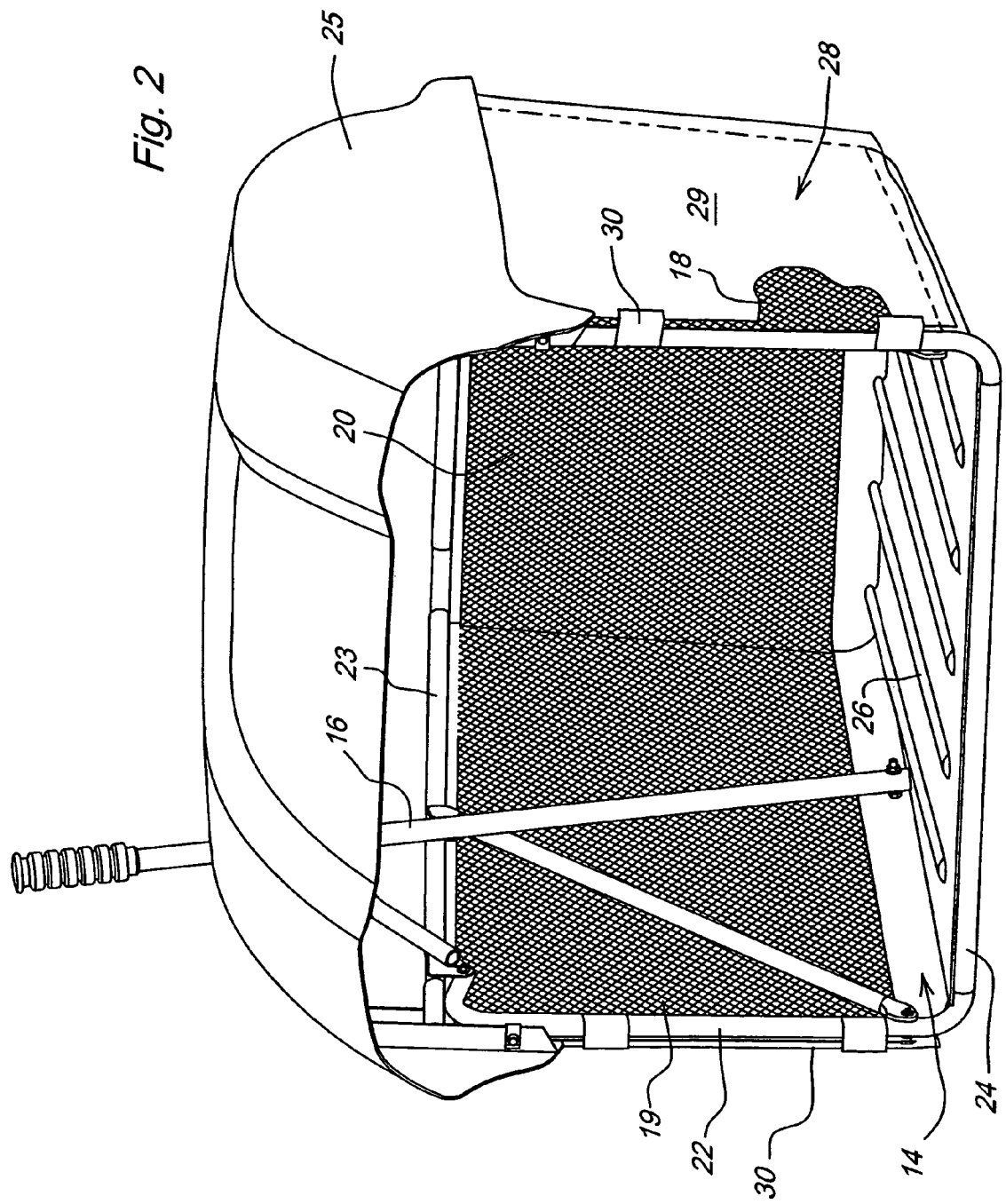
FIG. 2 is a front perspective view, partially in section, of a grass collection container with the flexible sound barrier of the first embodiment.

As shown in FIG. 2, in one embodiment, grass collection container 14 may include at least one air permeable fabric mesh bag or hopper having a plurality of generally vertically aligned panels. The bag or hopper may include left and right side panels 18, 19, and rear panel 20. In an alternative embodiment, the bag or hopper also may include an air permeable front panel and bottom panel (not shown). The air permeable panels of each bag or hopper may be a woven or mesh fabric or other flexible material that allows air to blow through the panels and trap grass clippings inside.

In one embodiment, at least a portion of each side of a bag or hopper may be attached to a framework. For example, the air permeable panels may be attached to and supported by a framework made of ¾ inch tubular steel, and having front members 22, top member 23, and bottom members 24. To fasten the panels to the framework, the top and front edges of the air permeable panels may be stitched to clips 30 such as J-channels that fasten to one or more members of the framework. Alternatively, each bag or hopper 17 may hang from a framework around only the top of the bag or hopper.

In one embodiment, each bag or hopper may be covered by top cover 25 made of plastic, metal or other solid material. Optionally, the bag or hopper also may include or be supported by bottom plate 26 and front plate 27 made of plastic, metal or other solid material. The cover and/or one or more of the plates may be fastened to the rear of the vehicle, and may be hinged or tilted up using lever 16 to pivot and empty the clippings from the bag or hopper. Optionally, side panels 18, 19 of the bag or hopper may contact or seal with front plate 27 when in use.

In one embodiment, the discharge duct from the mower deck may be connected to the grass collection container through an opening in front plate 27. Alternatively, the discharge duct may be connected to the grass collection container through top cover 25.

In one embodiment, flexible sound barrier curtain 28 may surround each mesh or air permeable side panel of the bag or hopper. The flexible sound barrier curtain is not attached or adhered to the mesh or air permeable surfaces of the bag or hopper. For example, the flexible sound barrier curtain may be a one-piece curtain that has left and right side panels 29, 30, and rear panel 31. In this embodiment, the flexible sound barrier curtain surrounds the mesh sides 18, 19 and rear 20 of the bag or hopper.

In an alternative embodiment (not shown), the flexible sound barrier curtain may surround a bag or hopper having four air permeable side panels. Alternatively, the flexible sound barrier curtain may surround a pair of bags or hoppers. In either case, the flexible sound barrier curtain is not attached or adhered to the air permeable surfaces of the bag or hopper.

In one embodiment, at least a portion of the upper edges of the flexible sound barrier curtain may be attached to the front member 22 and the top member 23, but not the bottom member 24, of the framework. For example, the flexible sound barrier curtain may be attached to the framework by stitching the upper and front edges of the curtain to the same clip or J-channel as the bag or hopper.

In one embodiment, the lower edges of the flexible sound barrier curtain may be unattached to the framework, and unattached to the bag or hopper. The flexible sound barrier curtain may hang down over the side panels and rear panel of the bag or hopper.

In one embodiment, the flexible sound barrier curtain allows air to flow out from the air permeable panels of the bag or hopper and downwardly through a gap 32 between the bag or hopper and the flexible sound barrier curtain. Air flow through the bag or hopper is sufficient to provide acceptable grass collection. The air flow into and through the gap 32 may urge the flexible sound barrier curtain outwardly from the air permeable surfaces so that the flexible sound barrier curtain may be separated between about 3 mm and about 20 mm from the outside surfaces of the bag or hopper.

In one embodiment, the flexible sound barrier curtain may be a rubber membrane that extends downwardly to a height or position near the lower edge of the side panels and rear panel of the bag or hopper. When mowing, the flexible sound barrier curtain may absorb much of the noise from air flow into and through the grass collection container, and deflect some of the noise downward toward the grass or ground. As a result, the flexible sound barrier curtain may provide a significant reduction in noise from a grass mowing machine operating in the grass collection mode.

In one embodiment, the flexible sound barrier curtain has a thickness between about 1 mm and about 5 mm. The effectiveness of the flexible sound barrier curtain may depend, at least in part, on the thickness and choice of material. However, it is preferred that the material for the flexible sound barrier curtain includes a rubber or vinyl component.

Tests were performed to determine the various different thicknesses and materials for the flexible sound barrier curtain. A preferred material is cloth-backed vinyl with a thickness of about 2 mm and a weight of about 1 lb./sq. ft., which achieved a noise reduction of about 2.5 dB(A). Masticated rubber with a thickness of about 5 mm achieved noise reduction of about 2 dB(A). Cloth-backed vinyl having a thickness of about 1 mm and a weight of about ½ lb./sq. ft. achieved a noise reduction of about 1.8 dB(A). Nylon fabric with a thin vinyl membrane achieved a noise reduction of about 1.5 dB(A).

The above examples provide some guidance as to preferred materials and thicknesses for the flexible sound barrier curtain. Materials having a rubber or vinyl layer and a thickness of about 1 mm to about 5 mm were found to be effective for noise reduction, and were sufficiently flexible for the intended application, light in weight, and cost effective.

The flexible sound barrier curtain has several advantages, in addition to noise reduction. The flexible sound barrier curtain may deflect dirt, dust and debris that may leak through an air permeable bag or hopper during use. As a result, less dirt, dust and debris may be inhaled by the operator and get on the grass mowing machine. Second, the flexible sound barrier curtain may be shipped or stored in a compact volume. For example, the grass collection container and flexible sound barrier may be assembled and folded at the time of manufacture, so that they may be shipped in a small shipping container.

Having described the preferred embodiment, it will become apparent that various modifications can be made without departing from the scope of the invention as defined in the accompanying claims.

The invention claimed is:

1. An apparatus comprising:
   a grass collection container having a plurality of generally vertically aligned air permeable panels;
   a frame having front, top and bottom members supporting the grass collection container; and
   a flexible sound barrier curtain attached only to the top member of the frame and unattached to the vertically aligned air permeable panels such that there is an air passage surrounding the panels and separating the flexible sound barrier curtain from the panels.

2. The apparatus of claim 1 wherein the flexible sound barrier curtain has a material thickness of between about 1 mm and about 5 mm.

3. The apparatus of claim 1 wherein the flexible sound barrier curtain has a vinyl layer.

4. The apparatus of claim 1 wherein the grass collection container has three vertically aligned air permeable panels.

5. The apparatus of claim 1 further comprising a lever attached to the frame wherein the grass collection container and flexible sound barrier curtain are pivotable together for emptying.

6. The apparatus of claim 1 further comprising a plastic top cover on the grass collection container.

7. A grass collection container comprising:
   a plastic top cover;
   a bag attached to and supported by a frame having a top member under the plastic top cover and having air permeable panels fastened to the frame;
   a flexible sound barrier curtain attached to the top member of the frame to hang over and surround the air permeable panels without attachment to the air permeable panels, the flexible sound barrier curtain having a thickness of between about 1 mm and about 5 mm; and
   an air passage separating the bag from the flexible sound barrier curtain for air flow out of the air permeable panels and through a gap between the bag and flexible sound barrier curtain.

8. The grass collection container of claim 7 wherein the bag has three air permeable panels.

9. The grass collection container of claim 7 further comprising a solid bottom plate attached to the air permeable panels.

10. The grass collection container of claim 7 wherein the sound barrier curtain includes a vinyl layer.

11. The grass collection container of claim 7 further comprising a lever attached to the frame for pivoting the grass collection container and flexible sound barrier curtain.

12. An apparatus comprising:
 a grass mowing machine having a mower deck with a rearwardly extending discharge chute and a blower to propel grass clippings through the chute;
 a grass collection container attached to the discharge chute and having a plurality of downward extending mesh panels attached to a framework with top and bottom members; and
 a flexible sound barrier curtain hanging from the top members over the downward extending mesh panels and surrounding but unattached to the mesh panels and separated sufficiently from the grass collection container to provide an air flow passage through a gap between the mesh panels and the sound barrier curtain.

13. The apparatus of claim 12 further comprising a solid top cover on the grass collection container.

14. The apparatus of claim 12 further comprising a solid bottom on the grass collection container.

15. The apparatus of claim 12 further comprising a lever attached to the framework to tilt and empty the grass collection container and flexible sound barrier curtain.

16. The apparatus of claim 12 wherein the flexible sound barrier curtain has a thickness of between about 1 mm and about 5 mm.

* * * * *